United States Patent [19]

Yu et al.

[11] Patent Number: 5,714,290
[45] Date of Patent: Feb. 3, 1998

[54] FLEXIBLE BELTS HAVING A BENT SEAM

[75] Inventors: Robert C. U. Yu, Webster; Donald C. Von Hoene, Fairport, both of N.Y.

[73] Assignee: Xerox Corporation, Stamford, Conn.

[21] Appl. No.: 347,658

[22] Filed: Dec. 1, 1994

[51] Int. Cl.⁶ .................................................. G03G 5/10
[52] U.S. Cl. ........................... 430/56; 430/57; 430/58; 430/59; 430/127; 430/133; 428/57
[58] Field of Search ............................ 430/58, 56, 57, 430/59, 127, 133; 428/57; 355/212

[56] References Cited

U.S. PATENT DOCUMENTS

| | | | |
|---|---|---|---|
| 3,493,448 | 2/1970 | Powell et al. | 156/73 |
| 4,410,575 | 10/1983 | Obayashi et al. | 428/57 |
| 4,430,146 | 2/1984 | Johnson | 156/502 |
| 4,532,166 | 7/1985 | Thomsen et al. | 428/57 |
| 4,648,931 | 3/1987 | Johnston | 156/251 |
| 4,758,486 | 7/1988 | Yamazaki et al. | 430/56 |
| 4,788,572 | 11/1988 | Slayton et al. | 355/3 |
| 4,878,985 | 11/1989 | Thomsen et al. | 156/459 |
| 4,883,742 | 11/1989 | Wallbillich et al. | 430/275 |
| 4,937,117 | 6/1990 | Yu | 428/57 |
| 4,943,508 | 7/1990 | Yu | 430/129 |
| 4,959,109 | 9/1990 | Swain et al. | 156/73.4 |
| 4,968,369 | 11/1990 | Darcy et al. | 156/217 |
| 5,455,136 | 10/1995 | Yu et al. | 430/59 |

Primary Examiner—John S. Chu

[57] ABSTRACT

A flexible belt comprising a flexible support layer, at least one coating comprising a film forming polymer, and a seam having a bent shape extending from one edge of the belt to the opposite edge of the belt. The flexible electrostatographic imaging belt may be fabricated by providing a sheet having two parallel sides and two opposite ends having matching bent profiles, the sheet having a first major exterior surface opposite and parallel to a second major exterior surface, overlapping an edge of the first major exterior surface adjacent one of the ends onto an edge of the second major exterior surface adjacent the other one of the ends to form a overlapped joint in which the bent profiles of the opposite ends match, and permanently securing the ends to each other to form a seam having a bent shape. This seamed flexible electrostatographic imaging belt may be used in an electrostatographic imaging process.

20 Claims, 9 Drawing Sheets

FLEXIBLE BELTS HAVING A BENT SEAM

BACKGROUND OF THE INVENTION

This invention relates in general to flexible belts, and more specifically, to flexible belts having a bent seam configuration and methods for fabricating and using the belts.

Coated flexible belts or tubes are commonly utilized for numerous purposes such as electrostatographic imaging members, conveyor belts, drive belts, intermediate image transfer belts, sheet transport belts, document handling belts, donor belts for transporting toner particles, and the like.

Flexible belts, such as electrostatographic imaging members, are well known. Typical electrostatographic flexible imaging members include, for example, photoreceptors for electrophotographic imaging systems, and electroreceptors or ionographic imaging members for electrographic imaging systems. Electrostatographic imaging member belts typically have a welded seam. For electrophotographic applications, the imaging members preferably comprise a flexible substrate coated with one or more layers of photoconductive material. The substrates are usually organic materials such as a film forming polymer. The photoconductive coatings applied to these substrates may comprise inorganic materials such as selenium or selenium alloys, organic materials, or combinations of organic and inorganic materials. The organic photoconductive layers may comprise, for example, a single binder layer or multilayers comprising, for example, a charge generating layer and a charge transport layer. The charge generating layer is capable of photogenerating pairs of electrons and holes and injecting the photogenerated holes into the charge transport layer. The basic process for using electrostatographic flexible imaging members is well known in the art.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One typical type of multilayered imaging member that has been employed as a belt in electrophotographic imaging systems is a photoreceptor comprising a supporting substrate, a conductive layer, a hole blocking layer, an adhesive layer, a charge generating layer, a charge transport layer, a conductive ground strip layer adjacent to one edge of the imaging layers, and an anti-curl back coating at the back side of the supporting substrate opposite to the electrophotographic active layers to render the desirable imaging member flatness. This imaging member may also comprise an additional coating layer, such as an optional overcoating layer to protect the exposed charge transport layer from wear.

The electrophotographic imaging flexible member is usually fabricated from a sheet cut from a web. The sheets are generally rectangular in shape. All sides may be of the same length, or one pair of parallel sides may be longer than the other pair of parallel sides. The sheets are fabricated into a belt by overlap joining the opposite marginal end regions of the sheet. A seam is typically produced in the overlapping marginal end regions at the point of joining. Joining may be effected by any suitable means. Typical joining techniques include ultrasonic welding, gluing, taping, pressure heat fusing and the like. Ultrasonic welding is generally the preferred method of joining for flexible polymeric sheets because of its speed, cleanliness (no solvents) and production of a thin and narrow seam. In addition, ultrasonic welding is preferred because it causes the generation of heat at the contiguous overlapping marginal end regions of the sheet to maximize melting of one or more coating layers therein and facilitate direct contact of the supporting substrate at the end regions for overlap fusing.

The flexible imaging member used in an electrophotographic imaging machine can be a typical photoreceptor belt fabricated by the ultrasonic welding of the overlapped opposite ends of a rectangular sheet. The expression "rectangular", as employed herein, is intended to include four sided sheets where the length of two parallel sides is unequal to the other two parallel sides and the adjacent sides are perpendicular to each other, or sheets where all the sides are of equal length to form a square. In the ultrasonic seam welding process, ultrasonic energy transmitted to the overlap region is used to melt the coating layers of the photoconductive sheet thereby providing direct substrate fusing into a seam. The ultrasonic welded seams of multilayered photoreceptor belts are relatively brittle and low in elasticity and toughness. This joining technique by ultrasonic welding process, can result in the formation of two flashings and two splashings that project, respectively, beyond the edges of the photoreceptor belt and either side of the overlap region of the seam. The seam flashings can be removed from either edge of the belt with the use of a reciprocating punch or notching device according to the procedures described in U.S. Pat. No. 4,937,117, the entire disclosure thereof being incorporated herein by reference. The reciprocating punch has small circular section and removes the flashings and part of the seam to form a generally semi-circular notch in either edge of the belt. However, with the overlap and presence of two seam splashings, the top splashing over the charge transport layer while the bottom one on the anti-curl back coating, the flexible imaging member is about 1.6 times thicker in the seam region than that of the remainder thereof (in a typical example, 188 micrometers versus 116 micrometers).

The photoreceptor belt undergoes incessant repetition of mechanical stress/strain as it is cycled over a plurality of belt support rollers in an electrophotographic imaging apparatus. The excessive thickness of the photoreceptor belt in the seam region due to the presence of the splashing and seam overlap results in a large induced bending strain as the seam passes over each support roller. Generally, small diameter support rollers, highly desirable for simple, reliable copy paper self-stripping systems, are used in compact electrophotographic imaging apparatus which require a photoreceptor belt to operate in a very confined space. Unfortunately, small diameter rollers, e.g., less than about 0.75 inch (19 millimeters) in diameter, raise the threshold of the mechanical performance criteria for photoreceptor belts to such a high level that premature photoreceptor belt seam failure can frequently occur thereby shortening the service life of the belt. For example, when bent over a 19 millimeter roller, a conventional commercially available XEROX® welded photoreceptor belt seam may develop a 0.96 percent induced bending strain. Compared to a 0.59 percent tensile bending strain for the rest of the belt, the 0.96 percent tensile strain in the seam region of the belt represents a 63 percent increase in stress placed upon the overlapped seam and splashing which leads to the development of seam cracking, delamination, and tearing during extended cycling.

Under dynamic fatiguing conditions, the seam overlap and splashing provide a focal point for stress concentration and become the initial point of failure that affects the mechanical integrity of the belt. The excessive thickness of the seam overlap and splashing, thus tend to shorten the mechanical life of the seam and, hence, adversely affects the service life of the flexible member belt in copiers, duplicators, and printers. The excessive seam thickness and rough topography of the outer splashing cause the development of large lateral friction forces against cleaning blades during electrophotographic imaging and cleaning processes. Moreover, the collision of the inner seam splashing with toner image acoustic transfer assist devices and drive rolls also disturb the belt during cycling, resulting in significant belt cycling and transporting speed changes. These mechanical interactions have been observed to severely affect the life of the imaging belt, exacerbate blade wear, and induce belt velocity variations during imaging belt machine operation.

INFORMATION DISCLOSURE STATEMENT

U.S. Pat. No. 4,788,572 issued to D. Slayton et al. on Jul. 19, 1988—Improved dual belt synchronization is disclosed for a print engine for color electrophotography using a photoreceptor belt and a seamless transfer belt on which a composite image is built up. Improved synchronization of the two belt drives enhances image registration. The photoreceptor belt may have a skewed seam. A tension mechanism used in conjunction with the belts prevents rapid changes in the belt dimensions. An improved transfer belt cleaner system is synchronized with the belt drives such that excess toner is not left in the imaging area of the transfer belt.

U.S. Pat. No. 4,758,486 issued to J. Yamazaki et al. on Jul. 19, 1988—The fabrication of an endless belt shaped electrophotographic photoconductor is described. The belt comprises an electroconductive support material, a photoconductive layer, and a joint portion by which the electrophotographic photoconductor is worked into the shape of an endless belt. The joint portion is covered with an electroconductive overcoating layer comprising a polymeric material having a glass transition temperature of −10° C. or lower and finely divided electroconductive particles, or the joint portion further comprises a joint reinforcement resin layer which is formed so as to be inserted between the electroconductive overcoating layer and the photoconductive layer in the joint portion.

U.S. Pat. No. 4,943,508 issued to R. Yu on Jul. 24, 1990—A process is disclosed for fabricating an electrophotographic imaging member having certain specific materials in various layers such as a copolyester in an adhesive layer. Resistance to delamination during cycling is described.

U.S. Pat. No. 4,883,742 issued to G. Wallbillich on Nov. 28, 1989—The joining of an end and/or lateral areas of thermoplastically processable photosensitive layers is disclosed. The end and/or lateral areas of photosensitive layers are overlapped to avoid bubbles and air cavities between the end and/or lateral areas. The overlapped area is then heated under pressure to firmly join the areas together. The joined photosensitive layer is then treated and smoothed with shaping to exact size.

U.S. Pat. No. 4,410,575 issued to T. Obayashi et al. on Oct. 18, 1983—A method is disclosed for lap welding fabrics together by superposing two end portions of one or two fabrics on each other with an interposing bonding tape between the superposed two end portions. The method includes applying a high frequency wave treatment and/or heat treatment by pressing at least one of the superposed end portions to melt the interposed portion of the bonding tape in order to lap melt the fabrics to each other. At least one side edge portion of the tape extends outwardly over an edge of the end portion which is deformed from the forces absorbed when the heat treatment and frequency wave treatment are applied. The fabrics may be made of any fibers or natural fibers.

U.S. Pat. No. 3,493,448 issued to J. Powell et al. on Feb. 3, 1970—A method is disclosed for splicing photographic film by an ultrasonic welding apparatus. The method includes sandblasting the ends to be welded and chilling the fused ends to be welded and chilling the fused ends while they are being compressed by the ultrasonic tool.

U.S. Pat. No. 4,968,369 issued to J. Darcy et al on Nov. 6, 1990—An apparatus and process are disclosed for fabricating belts wherein the leading edge and the trailing edge are overlapped to form a lap joint. Welding of the belt results in flashings at each end of the welded lap joint. A punch cutter is utilized to remove weld flashings at each end of the welded belt lap joint.

U.S. Pat. No. 4,878,985 issued to K. Thomsen et al. on Nov. 7, 1989 and U.S. Pat. No. 4,838,964 issued to K. Thomsen et al. on Jun. 13, 1989—Apparatus and process are disclosed for fabricating belts wherein the leading edge and the trailing edge are overlapped to form a loop of a web segment loosely suspended from the overlapped joint. An ultrasonic belt welding station comprising an ultrasonic horn and transducer assembly is utilized in the fabrication of the belt.

U.S. Pat. No. 4,937,117 issued to R. Yu on Jun. 26, 1990—A flexible belt is disclosed which is fabricated from a substantially rectangular sheet having a first edge joined to a second parallel edge to form a seam. Flashings at the ends of the welded seam of the belt are removed by means of a notching device capable of cutting specific elongated shape.

U.S. Pat. No. 4,959,109 issued to E. Swain et al. on Sep. 25, 1990—Process and apparatus are disclosed for fabricating a unitary belt on rotatable mandrels. A web is wrapped around each rotatable mandrel and severed to form a trailing edge which overlaps the leading edge to form a seam that is thereafter welded.

U.S. Pat. No. 4,532,166 issued to K. Thomsen et al. on Jul. 30, 1985—A welded web and a process for forming the web are disclosed. At least one aperture is formed in at least the first edge of the web. The first edge is then overlapped on an exposed surface of a second edge. Ultrasonic welding may be used to raise the temperature of at least the region of contiguous contact adjacent the aperture. Thermoplastic material from the second edge at least partially fills the aperture thereby bonding the first edge to the second edge.

U.S. Pat. No. 4,648,931 issued to O. Johnston on Mar. 10, 1987—A method and apparatus are disclosed for forming a bead seal in a biaxially oriented polymer film by heat bonding. The method comprises pressing together web layers in a sealing zone, a selected segment of the pressed web being heated above the bonding temperature of the plastic while adjacent web segments are maintained below that temperature. The heated web segment has a relatively lower surface friction than the surfaces pressing the adjacent web segment. The layers of the heated segment of the web are physically unrestrained against shrinking during heating and are allowed to shrink back to their pre-oriented molecular configuration while the adjacent segment is restrained against movement. A hermetic bead seal is thus formed between the web layers.

U.S. Pat. No. 4,430,146 issued to E. Johnson on Feb. 7, 1984—A belt splicing method and apparatus are disclosed. The apparatus comprises pairs of longitudinal bars on which are respectively mounted platen heating assemblies. One bar is centrally supported pivotally on a clamping arrangement and the other bar is removably connected with the clamping arrangement in a manner permitting pivotable disposition of the bars with their platens in opposed facing parallel relation at various spacings. The apparatus facilitates a new belt splicing method eliminating the conventional need to use supplementary liquid thermoplastic material to effect bonding of the belt ends. By this process, a new belt splice is provided with the spliced ends being fused together with their respective thermoplastic material.

U.S. patent application Ser. No. 08/316,962 filed by R. Yu on Oct. 3, 1994, now abandoned in favor of a continuation application—A seamed flexible belt and process for fabricating the belt is disclosed. A flexible sheet having a substantially rectangular shape, a first major exterior surface opposite and parallel to a second major exterior surface and a first edge surface of a first marginal end region opposite to and parallel with a second edge surface of a second marginal end region is treated by removing by ablation with a masked excimer laser beam a first segment of material from the first major exterior surface at the first marginal end region to form at least one recess comprising at least one fresh substantially flat surface intersecting at least one adjacent wall at a right angle, the flat surface being substantially parallel to and spaced from the second major exterior surface; removing by ablation with a masked excimer laser beam a second segment of material from the second major exterior surface at the second marginal end region to form at least one recess comprising at least one fresh substantially flat surface intersecting at least one adjacent wall at a right angle, the flat surface being substantially parallel to and spaced from the first major exterior surface; overlapping the first marginal end region over the second marginal end region whereby the fresh substantially flat surface at the first marginal end surface mates with the fresh substantially flat surface at the second marginal end surface; and fusing the overlapped end regions together to form a fused seam.

U.S. patent application Ser. No. 08/055,339 filed by R. Yu et al. on May 3, 1993, now U.S. Pat. No. 5,455,136—Discloses a flexible electrostatographic imaging belt comprising a support layer, a coating including a film forming polymer, and a permanent skewed seam. The electrostatographic imaging belt may be fabricated by providing a sheet having a parallelogram shape with slanted ends, the sheet having a first major exterior surface opposite and parallel to a second major exterior surface, overlapping an edge of the first major exterior surface adjacent a first of the slanted ends onto an edge of the second major exterior surface of adjacent a second slanted of the ends to form a skewed seam, and securing the ends to each other to form a permanent skewed seam. This skewed seam electrostatographic imaging belt may be used in an electrostatographic imaging process.

U.S. patent application Ser. No. 07/815,092 filed by R. Yu et al on Dec. 27, 1991, U.S. Pat. No. 5,273,799—A seamed flexible imaging member is disclosed comprising a sheet having a first marginal end region and a second marginal end region. The first marginal end region and the second marginal end region of the sheet are secured to one another by a material which may include a portion of the sheet, a separate securing material or both. The material defines a planar surface extending in a direction transverse to the sheet with one end of the planar surface being integral with the sheet adjacent to one end of the sheet and the other end of the planar surface being integral with the sheet adjacent the other end of the sheet. The planar surface minimizes stress on the sheet, particularly stress caused by the flexible imaging member bending over small diameter rollers of a belt module within an electrophotographic imaging apparatus U.S. patent application Ser. No. 07/982,530 filed by R. Yu on Nov. 27, 1992, now abandoned in favor of a continuation application—A process is disclosed which includes providing a flexible substantially rectangular sheet having a first major exterior surface opposite and parallel to a second major exterior surface, removing or displacing material from the first major exterior surface adjacent and parallel to a first edge of the sheet to form a new first surface having an elongated, curvilinear "S" shaped profile when viewed in a direction parallel to the first edge, overlapping the new first surface and a second surface adjacent a second edge of the sheet whereby the first new surface contacts the second surface to form a mated surface region, the second surface being adjacent to or part of the second major exterior surface to form the sheet into a loop, the second edge being at an end of the sheet opposite from the first edge, and permanently joining the new first surface to the second surface into a seam to form a seamed belt of this invention. The resulting welded belt has a seam thickness of less than about 120 percent of the total thickness of the belt.

Thus, there is a continuing need for extending the functional life of flexible electrostatographic imaging member belts to achieve improved resistance to tearing, delamination, and cracking at the seam, as well as enhanced mechanical interactions with cleaning blades, toner image acoustic transfer assisting devices, or other contacting subsystems.

SUMMARY OF THE INVENTION

It is, therefore, an object of the present invention to provide an improved flexible electrostatographic imaging belt which overcomes the above-noted disadvantages.

It is yet another object of the present invention to provide an improved flexible electrostatographic imaging belt having a seam that exhibits greater resistance to tensile rupture.

It is still another object of the present invention to provide an improved flexible electrostatographic imaging belt having a seam which exhibits greater resistance to dynamic fatigue delamination.

It is another object of the present invention to provide an improved flexible electrostatographic imaging belt having improved resistance to fatigue bending induced cracking.

It is yet another object of the present invention to provide an improved flexible electrostatographic imaging electrostatographic imaging member belt which exhibits improved life during belt cycling.

It is still another object of the present invention to provide an improved process for fabricating flexible electrostatographic imaging belts.

It is another object of the present invention to provide an improved flexible electrostatographic imaging belt that reduces or eliminates belt transporting velocity variations during belt cycling.

It is yet a further object of the present invention to provide an improved flexible electrostatographic imaging belt having a seam that minimizes interactions with contacting subsystems such as a cleaning blade, toner image acoustic transfer assist device, and the like.

The foregoing objects and others are accomplished in accordance with this invention by providing a flexible belt comprising a flexible support layer, at least one coating comprising a film forming polymer, and a seam having a bent shape extending from one edge of the belt to the opposite edge of the belt. The flexible electrostatographic imaging belt may be fabricated by providing a sheet having two parallel sides and two opposite ends having matching bent profiles, the sheet having a first major exterior surface opposite and parallel to a second major exterior surface, overlapping an edge of the first major exterior surface adjacent one of the ends onto an edge of the second major exterior surface adjacent the other one of the ends to form a overlapped joint in which the bent profiles of the opposite ends match, and permanently securing the ends to each other to form a seam having a bent shape. This seamed electrostatographic imaging belt may be used in an electrostatographic imaging process.

A typical prior art seam traverses the width of an imaging belt. This seam is straight and perpendicular to the edges of the belt. However, it can also be straight and at an angle to the edges of the belt. By comparison, the seam design of the present invention is significantly different in shape from a straight prior art seam and exhibits a bent or wavy shape as it extends across the width of the belt. The expression "bent" as employed here is defined as a wavy, undulating, serpentine or jagged shape of a seam profile having an imaginary straight connecting line linking the starting point and the end point of the seam as it traverses the width of the belt. Typical bent shapes include, for example, sine wave, square wave, rectangular wave, sawtooth wave, trapezoidal wave, and the like. The relationship between the bent seam and the imaginary straight connecting line can vary depending upon the wavelength of the bent seam. For example, for a bent seam, having a length of one half wavelength extending across the full width of the imaging belt, that connects the ends of the imaginary straight connecting line, the bent seam will not cross the imaginary straight connecting line. However, a bent seam having a length greater than one half wavelength will cross the imaginary straight connecting line at least once. Thus, in this latter embodiment, the imaginary straight connecting line passes through the ripples, waves or teeth of the seam at least once. More specifically, the imaginary straight connecting will line pass only once through the ripples, waves or teeth of a bent seam have one full wave shape cycle once and three times through a bent seam having the shape of two full wave shaped cycles. The imaginary straight connecting line of the seam of this invention may be perpendicular to both edges of the belt or, alternatively, skewed relative to both edges of the belt. The extent of deviation or skew of the imaginary straight connecting line from perpendicular relative to the edges of the belt is typically between about 0.5 degree and about 60 degree. A range from about 1 degree to about 20 degrees is particularly preferred. For optimum result, the skew angle of the imaginary straight connecting line is between about 2 degrees and about 10 degrees from an imaginary straight line perpendicular to the edges of the belt and originating from one end of the imaginary straight connecting line. Although the bent seam shape of this invention may have various morphological characteristics such as a sine wave, square wave, rectangular wave, sawtooth wave, trapezoidal wave, or the like, a sine wave seam configuration is particularly preferred because it provides a continuum of deviations from a straight line prior art seam as well as having a smooth seam profile without the sharp corners. Unlike smooth curvilinear lines in a sine wave, a wave having sharp corners such as a sawtooth, square, rectangular or trapezoidal wave tends to concentrate stress at the corners.

Electrostatographic flexible belt imaging members are well known in the art. Typical electrostatographic flexible belt imaging members include, for example, photoreceptors for electrophotographic imaging systems and electroreceptors or ionographic imaging members for electrographic imaging systems.

Electrostatographic flexible belt imaging members may have various configurations. A typical flexible supporting substrate has an electrically conductive surface. For electrophotographic imaging members, at least one photoconductive layer is utilized over the electrically conductive surface. A charge (usually a hole, but occasionally an electron) blocking layer may be employed between the electrically conductive layer and a photoconductive layer. If desired, an adhesive layer may be utilized between the charge blocking layer and the photoconductive layer. For multilayered photoreceptors, a charge generation layer usually overlies the charge blocking layer. A charge transport layer is usually located over the charge generation layer. For ionographic imaging members, an electrically insulating dielectric layer is applied directly onto the electrically conductive surface.

The supporting substrate may be opaque or substantially transparent and may comprise numerous materials having the required mechanical properties. Accordingly, the substrate may comprise a layer of an electrically nonconductive or conductive material such as an inorganic or an organic composition. As electrically nonconducting materials there may be employed various resins known for this purpose including polyesters, polycarbonates, polyamides, polyurethanes, and the like which are flexible in thin webs. The electrically insulating or conductive substrate should be flexible and in the form of an endless flexible belt. Preferably, the endless flexible belt shaped substrate comprises a commercially available biaxially oriented polyester.

The thickness of the supporting substrate layer depends on numerous factors, including beam strength, mechanical toughness, and economical considerations. Thus, the substrate layer used for a flexible belt application may be of substantial thickness, for example, about 125 micrometers, or of a minimum thickness of not less than about 50 micrometers, provided that it produces no adverse effects on the belt. For practical purposes, the thickness of the substrate layer may range from about 65 micrometers to about 150 micrometers, and preferably from about 75 micrometers to about 100 micrometers for optimum flexibility, beam rigidity, and minimum stretch when cycled.

The conductive layer may vary in thickness over substantially wide ranges depending on the optical transparency and degree of flexibility desired for the electrostatographic member. Accordingly, for a flexible electrophotographic imaging device, the thickness of the conductive layer may be between about 20 angstroms to about 750 angstroms, and more preferably from about 100 angstroms to about 200 angstroms for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, copper, gold, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. A typical electrical resistivity for conductive layers for electrophotographic imaging members in slow speed copiers is about 102 to $10^3$ ohms/square.

After formation of an electrically conductive surface, a charge blocking layer may be applied thereto for photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. A preferred hole blocking layer comprises a reaction product between a hydrolyzed silane and the oxidized surface of a metal ground plane layer. The hole blocking layer should be continuous and have a dry thickness of less than about 0.2 micrometer.

An adhesive layer is usually applied to the charge blocking layer. Any suitable adhesive layer well known in the art may be utilized. Typical adhesive layer materials include, for example, polyesters, polyurethanes, and the like. Satisfactory results may be achieved with the adhesive layer thickness between about 0.05 micrometer and about 0.3 micrometer.

Any suitable charge generating (photogenerating) layer may be applied onto the adhesive layer. Charge generating layers are well know in the art and can comprise homogeneous layers or photoconductive particles dispersed in a film forming binder. Examples of charge generating layers are described, for example, in U.S. Pat. No. 3,357,989, U.S. Pat. No. 3,442,781, and U.S. Pat. No. 4,415,639, the disclosures thereof being incorporated herein in their entirety. Other suitable photogenerating materials known in the art may also be utilized, if desired.

Any suitable polymeric film forming binder material may be employed as the matrix in the photogenerating layer. Typical polymeric film forming materials include those described, for example, in U.S. Pat. No. 3,121,006, the disclosure thereof being incorporated herein in its entirety. The photogenerating composition or pigment may be present in the film forming binder composition in various amounts. Generally, from about 5 percent by volume to about 90 percent by volume of the photogenerating pigment is dispersed in about 10 percent by volume to about 90 percent by volume of the resinous binder.

The photogenerating layer generally ranges in thickness from about 0.1 micrometer to about 5 micrometers, preferably from about 0.3 micrometer to about 3 micrometers. The photogenerating layer thickness is related to binder content. Higher binder content compositions generally require thicker layers for photogeneration. When sublimation deposited pigments are used, the photogenerating layer thickness is preferably between about 0.1 micrometer and about 0.5 micrometer.

The charge transport layer may comprise any suitable transparent organic polymer or nonpolymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack. The charge transport layer is normally transparent in a wavelength region in which the electrophotographic imaging member is to be used when exposure is effected therethrough to ensure that most of the incident radiation is utilized by the underlying charge generating layer. When used with a transparent substrate, imagewise exposure or erase may be accomplished through the substrate with all light passing through the substrate. In this case, the charge transport material need not transmit light in the wavelength region of use if the charge generating layer is sandwiched between the substrate and the charge transport layer. The charge transport layer in conjunction with the charge generating layer is an insulator to the extent that an electrostatic charge placed on the charge transport layer is not conducted in the absence of illumination. Charge transport layer materials are well known in the art.

The charge transport layer may comprise activating compounds or charge transport molecules dispersed in normally, electrically inactive film forming polymeric materials. These charge transport molecules may be added to polymeric materials which are incapable of supporting the injection of photogenerated holes and incapable of allowing the transport of these holes. An especially preferred charge transport layer employed in multilayer photoconductors comprises from about 25 percent to about 75 percent by weight of at least one charge transporting aromatic amine, and about 75 percent to about 25 percent by weight of a polymeric film forming resin in which the aromatic amine is soluble.

Any suitable inactive resin binder may be employed. Typical inactive resin binders include polycarbonate resins, polyvinylcarbazole, polyester, polyarylate, polyacrylate, polyether, polysulfone, and the like. Molecular weights can vary from about 20,000 to about 150,000. When electrically active transporting polymeric materials such as polyethercarbonates are used for charge transport layer applications, inactive resin binders may be omitted from the charge transport coating layer formulation, if desired. Electrically active transporting polyether carbonates are well known and disclosed, for example, in U.S. Pat. Nos. 4,801,517, 4,806, 443, 4,806,444, 4,818,650 and 5,030,532, the disclosures of which are incorporated herein by reference in their entirety.

The thickness of the charge transport layer may range from about 10 micrometers to about 50 micrometers, and preferably from about 20 micrometers to about 35 micrometers.

An optional conventional ground strip may be utilized along one edge of the electrophotographic imaging member. The ground strip may comprise materials such as those enumerated in U.S. Pat. No. 4,664,995. The ground strip layer may have a thickness from about 7 micrometers to about 42 micrometers.

An optional conventional anti-curl layer may also be employed on the back side of the imaging member. The anti-curl layer may comprise organic polymers or inorganic polymers that are electrically insulating or slightly semiconductive. The anti-curl layer provides flatness and/or abrasion resistance. The thickness of the anti-curl layer is from about 3 micrometers to about 35 micrometers. An example of an anti-curl backing layer is described in U.S. Pat. No. 4,654, 284 the entire disclosure of this patent being incorporated herein by reference.

An optional conventional overcoating layer may also be used. The optional overcoating layer may comprise organic polymers or inorganic polymers that are electrically insulating or slightly semi-conductive. The overcoating layer may range in thickness from about 2 micrometers to about 8 micrometers.

For electrographic imaging members, a flexible dielectric layer overlying the conductive layer may be substituted for the photoconductive layers. Any suitable, conventional, flexible, electrically insulating dielectric polymer may be used in the dielectric layer of the electrographic imaging member.

Generally, electrostatographic imaging members are fabricated from webs by cutting the webs into rectangular sheets, overlapping a small segment of opposite ends of each sheet to form a loop and securing the overlapping ends of the sheet together and joined to form a narrow seam. The overlapping ends of the sheet may be secured to each other by any suitable technique. Typical securing processes include ultrasonic welding, gluing, taping, pressure heat fusing, and the like. Although the ultrasonic seam welding technique is generally preferred, any other suitable seaming processes may be employed to permanently join the ends for imaging belt fabrication. Securing techniques are well known and are disclosed, for example, in U.S. Pat. No. 4,532,166 and U.S. Pat. No. 4,838,964, U.S. Pat. No. 4,758,486 to Yamazaki et al., U.S. Pat. No. 4,430,146 to Johnson and U.S. Pat. No. 4,883,742 to Wallbillich et al., the entire disclosures of these patents being incorporated herein by reference. As discussed hereinabove, joining techniques, particularly the welding process, usually form flashings and splashings of molten thermoplastic material from the coating layers of the welded belt that projects beyond the edges of the belt and situated at the ends of the seam as well as at the either side of the overlap. The flashings described for prior art belt photoreceptors is removed by means of a reciprocating punch which removes the flashings and part of the seam to form a notch in either edge of the belt at the ends of the seam. The notch is shaped like a segment of a circle. It has, however, been demonstrated that the splashing present at the side of the seam overlap and on the top of the imaging layer of an electrostatographic imaging member belt can act as a focal point for concentrating stress to significantly reduce the service life of the seam due to development of cracking and delamination at the seam when the imaging member is subjected to fatigue bending stress.

Moreover, an excessive seam overlap thickness and both splashings can interfere with the functions of a cleaning blade, exacerbate blade wear and tear, affect quality of movement of the imaging belt, and disturb other subsystems, such as image acoustic transfer assist devices, during electrophotographic imaging belt processes. The bent seam of the belts of this invention eliminates the effects of instantaneous collisions of the entire conventional seam with the entire working surface of a cleaning blade, image acoustic transfer assist device, or other subsystem because the bent seam configuration of this invention reduces the undesirable impact of collisions to only progressive point contact interactions between the bent seam and the working surface of subsystems during image cycles. Further, in comparisons of the seam of an imaging member of this invention having a sine wave seam design to the straight seam configuration of a typical commercial welded imaging member when dynamically flexed over a 3 mm diameter roller, the seam of the commercial welded imaging member delaminated after only 8 cyclic flexes whereas delamination was not observed for the imaging member having the skewed seam of this invention until after 75 flexes. This dramatic difference is due to the fact that the full strength of the induced bending stress is acting directly against the straight commercial seam, while only a vector component of the stress is exerting against the bent seam. Therefore, the larger the amplitude of the wave, the smaller the vector component of stress acting upon the seam and the better the seam resists bending induced fatigue seam failure.

Significant extension of the functional life of the seam as well as suppression of mechanical interactions between the belt and the cleaning blade and other contacting subsystems are achieved with a belt having the bent seam design of this invention. When overlapped and joined by an ultrasonic welding process to form a welded seam, further mechanical life enhancements can be realized if the imaging member sheet has a pair of matching ripple cut ends with an imaginary center line which is skewed at an angle of between about 1 degree and about 20 degrees from an imaginary line perpendicular to the edges of the belt. An imaginary center line skew ranging from about 2 degrees to about 10 degrees from an imaginary line which is perpendicular to the edges of the belt gives optimum result, because the resulting seam configuration produces improved seam strength and resistance to fatigue seam delamination without wasting too much useful imaging member surface.

BRIEF DESCRIPTION OF THE DRAWINGS

A more complete understanding of the seam configuration of flexible electrophotographic imaging belts of the present invention can be achieved by reference to the accompanying drawings wherein.

The figures are merely schematic illustrations of the prior art and the present invention. They are not intended to indicate relative size and dimensions of actual seamed electrophotographic imaging members.

DETAILED DESCRIPTION OF THE DRAWINGS

For reasons of convenience, the invention description will focus on the fabrication of flexible multiple layered electrophotographic imaging member belts using various seam ripple shapes to improve imaging belt performance and to extend seam service life. These bent seam configurations, however, are also applicable to flexible electrographic imaging belts, conveyor belts, document handling belts, drive belts, intermediate image transfer belts, sheet transport belts, toner transport donor belts, and the like.

Figure 1:
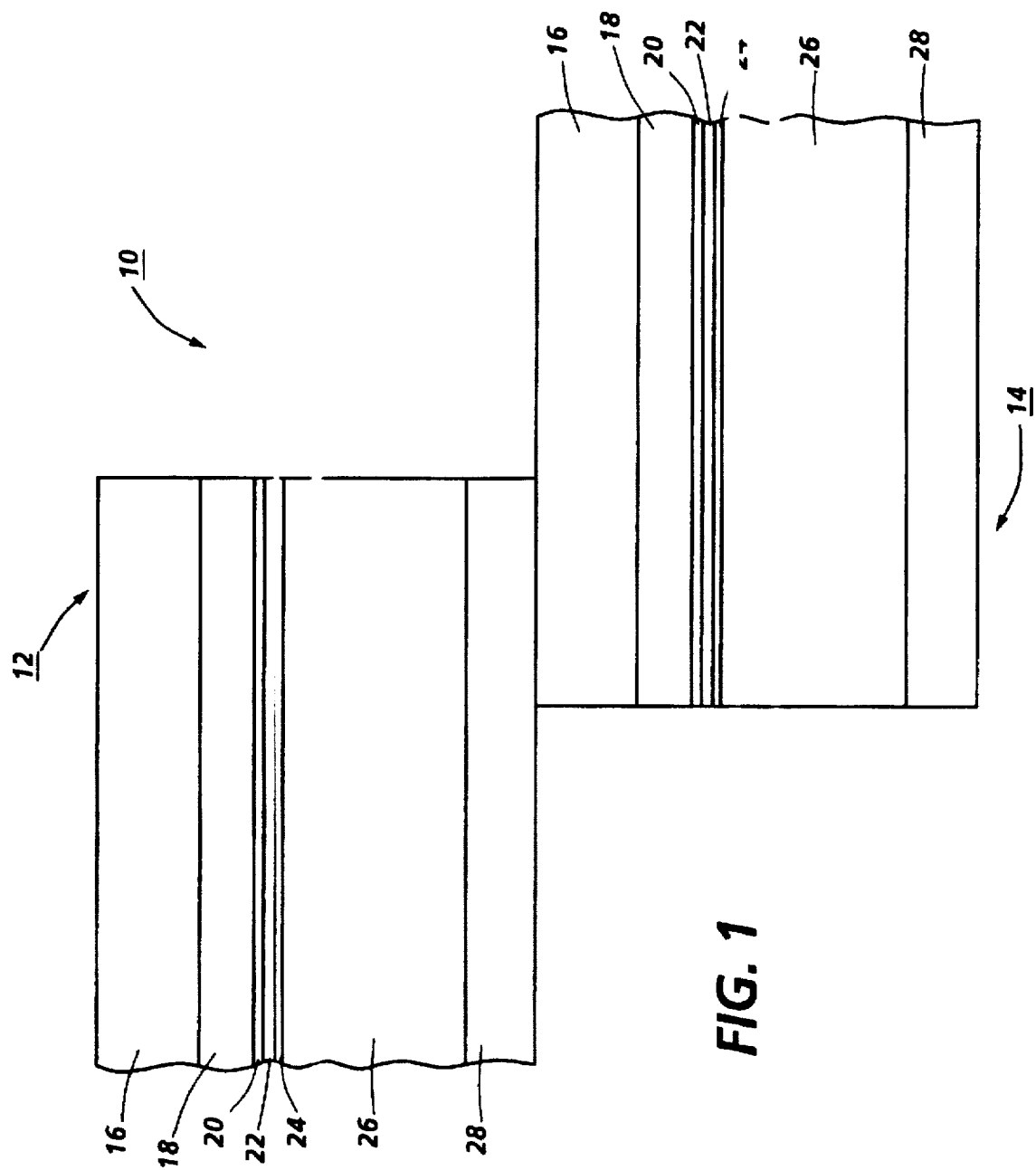
FIG. 1 is a cross sectional view of a flexible multiple layered electrophotographic imaging member secured by overlapping opposite ends.

Referring to FIG. 1, there is illustrated a flexible electrophotographic imaging member 10 in the form of a rectangular sheet having a first edge 12 overlapping a second edge 14 to form an overlap region, as known in the art. Satisfactory overlap widths range from about 0.5 millimeter to about 1.7 millimeters. The flexible electrophotographic imaging member 10 can be utilized in an electrophotographic imaging apparatus and may be a single layer or the illustrated multiple layer type photoreceptor. The layers of the flexible imaging member 10 can comprise numerous suitable materials having the required mechanical properties. These layers usually comprise charge transport layer 16, charge generating layer 18, adhesive layer 20), charge blocking layer 22, conductive layer 24, supporting substrate 26 and anti-curl backing layer 28. Examples of the types of layers and the properties thereof are described, for example, in U.S. Pat. Nos. 4,786,570, 4,937,117 and 5,021,309, the disclosures thereof being incorporated herein by reference in their entirety. If desired, the flexible imaging member 10 may comprise a charge generator layer sandwiched between a conductive surface and a charge transport layer.

Edges 12 and 14 can be joined by any suitable means. Typical joining techniques include, for example, gluing, taping, stapling, pressure and heat fusing to form a continuous member, such as a belt, sleeve, or cylinder.

Figure 2:
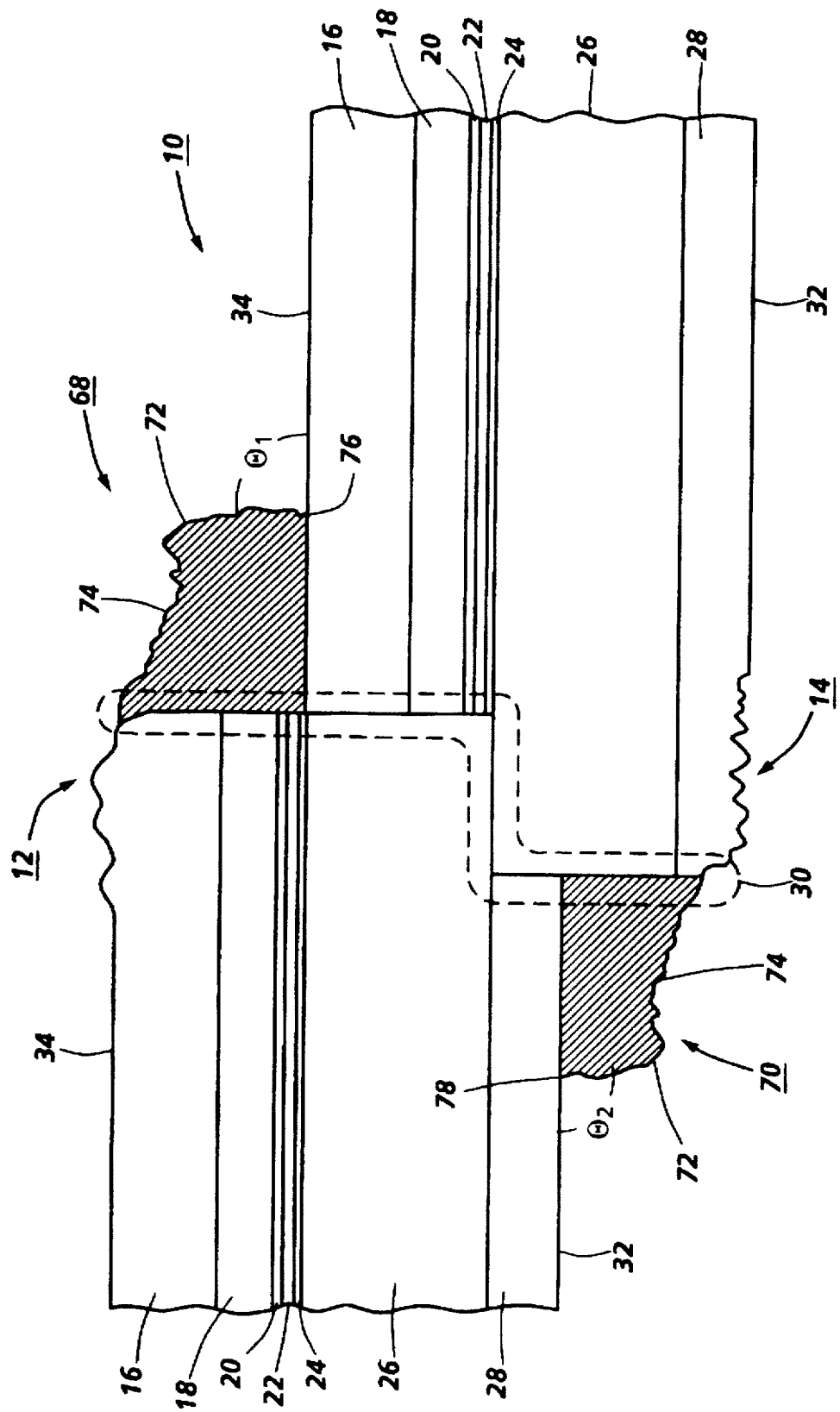
FIG. 2 is a cross sectional view of the flexible multiple layered electrophotographic imaging member of FIG. 1 joined by an ultrasonic welding technique.

Generally, an ultrasonic welding technique is preferred to bond edges 12 and 14 into a seam 30 in the overlap region as illustrated in FIG. 2. In the ultrasonic seam welding process, ultrasonic energy, applied to the overlap region, is used to melt the applicable layers of flexible imaging member 10 such as charge transport layer 16, charge generating layer 18, adhesive layer 20, charge blocking layer 22, conductive layer 24, a part of supporting substrate 26, and anti-curl backing layer. Flexible imaging member 10 is thus transformed from an electrophotographic imaging member sheet as illustrated in FIG. 1 into a continuous electrophotographic imaging seamed belt as shown in FIG. 2. Seam 30 (represented by dashed lines) joins opposite ends of flexible imaging member 10 such that the second major exterior surface 34 (and generally including at least one layer thereabove) at and/or near the first edge 12 is integrally joined with the first major exterior surface 32 (and generally at least one layer therebelow) at and/or near second edge 14. Welded seam 30 contains upper and lower splashings 68 and 70, respectively, at each end thereof as illustrated in FIG. 2. Splashings 68 and 70 are formed during the process of joining edges 12 and 14 together. Molten material is necessarily ejected from the overlap region to facilitate direct fusing of support substrate 26 (of first edge 12) to support substrate 26 (of second edge 14). This results in the formation of splashings 68 and 70. Upper splashing 68 is formed and positioned above the overlapping second edge 14 abutting second major exterior surface 34 and adjacent and abutting overlapping first edge 12. Lower splashing 70 is formed and positioned below the overlapping first edge 12 abutting first major exterior surface 32 and adjacent and abutting the overlapping second edge 14. Splashings 68 and 70 extend beyond the sides and the ends of seam 30 in the overlap region of welded flexible member 10 to form flashings. The extension of the splashings 68 and 70 beyond the sides and the ends of the seam 30 is undesirable for many machines, such as electrostatographic copiers and duplicators which require precise belt edge positioning of flexible imaging member 10 during machine operation. Generally, the protrusions of the splashings 68 and 70 (or flashings) extending beyond each end (not shown) of the seam usually are removed by a notching operation which cuts a slight notch into each end of the seam to remove the end splashings and a tiny portion of the seam itself.

A typical splashing has a thickness of about 68 micrometers. Each of the splashings 68 and 70 have an uneven but generally rectangular shape having a free side 72 extending inwardly from an exterior facing side 74 (extending generally parallel to either second major exterior surface 34 or first exterior major surface 32). Free side 72 of splashing 68 forms an approximately perpendicular angle $\theta_1$ with the first major exterior surface 32 of flexible imaging member 10. Similarly, free side 72 of splashing 70 forms an approximately perpendicular angle $\theta_2$ with the second major exterior surface 34 of the flexible imaging member 10. A junction site 76 is formed at the junction of side 72 of splashing 68 and the first major exterior surface 32 of the flexible imaging member 10. Likewise, a junction site 78 is formed at the junction of the free side 72 of the lower splashing 70 and the second exterior major surface 34 of the flexible imaging member 10. Both junction sites 76 and 78 provide focal points for stress concentration and become the initial sites of failure affecting the mechanical integrity of flexible imaging member 10.

During imaging machine operation, the flexible imaging member 10 cycles or bends over belt support rollers, not shown, particularly small diameter rollers, of an electrophotographic imaging apparatus. As a result of dynamic bending of flexible imaging member 10 during cycling, the small diameter rollers exert a bending strain on flexible imaging member 10 which causes large stress to develop generally around seam 30 due to the excessive thickness thereof.

The stress concentrations that are induced by bending near the junction sites 76 and 78 may reach values much larger than the average value of the stress over the entire belt length of flexible imaging member 10. The induced bending stress is inversely related to the diameter of the roller over which flexible imaging member 10 bends and directly related to the thickness of seam 30 of flexible imaging member 10. When flexible imaging member 10, contains an enlarged cross-sectional thickness at the overlap region, high localized stress occurs near the discontinuity, e.g. junction points 76 and 78.

When flexible imaging member 10 is bent over belt support rollers in an electrophotographic imaging apparatus (not shown), first major exterior surface 32 of flexible member 10, in contact the exterior surface of the roller, is under compression. In contrast, second major exterior surface 34 is stretched under tension. This is attributable to the fact that first major exterior surface 32 and second major exterior major surface 34 move through part of a circular path about a roller having a circular cross section. Since second major exterior surface 34 is located at a greater radial distance from the center of the roller than first exterior major surface 32, second major exterior surface 34 must travel a greater distance than first major exterior surface 32 in the same time period. Therefore, second major exterior surface 34 is stretched under tension relative to the generally central portion of the flexible imaging member 10 (the portion generally extending along the center of gravity of flexible imaging member 10). Conversely, first major exterior surface 32 is compressed relative to the generally central portion of flexible imaging member 10. Consequently, the bending stress at junction site 76 will be tension stress, and the bending stress at junction site 78 will be compression stress.

Figure 3:
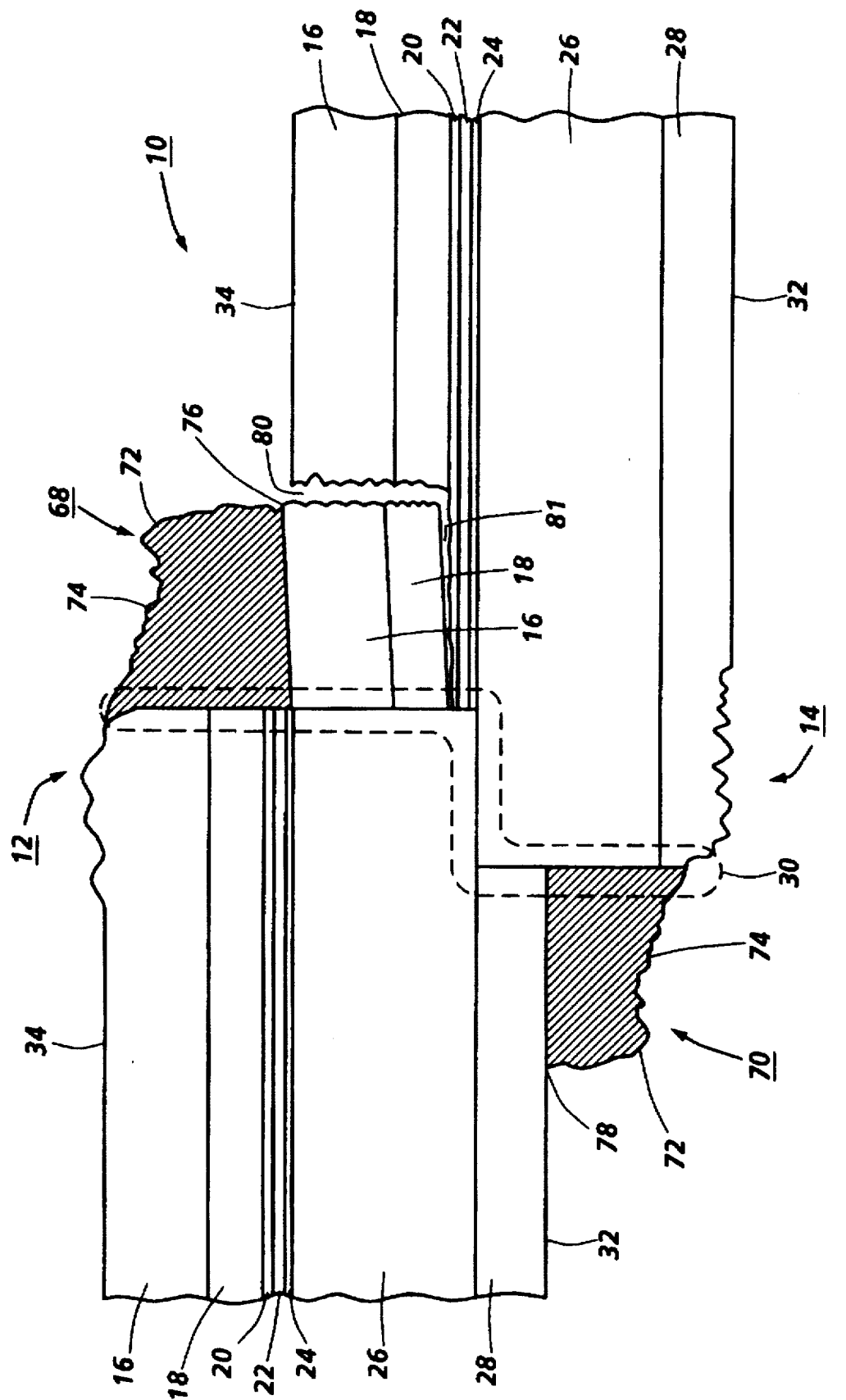
FIG. 3 is a cross sectional view of the flexible multiple layered seamed electrophotographic imaging belt of FIG. 2 exhibiting seam cracking and delamination after flexing over belt support rollers.

Compression stresses, such as at junction site 78, rarely cause seam 30 failure. Tension stresses, such as at junction site 76, however, are much more serious. The tension stress concentration at junction site 76 greatly increases the likelihood of tear initiation which will form a crack through the electrically active layers of flexible imaging member 10 as illustrated in FIG. 3. Tear 80, illustrated in FIG. 3, is adjacent second edge 14 of the flexible imaging member 10. The generally vertically extending tear 80 is initiated in charge transport layer 16 and propagates through charge generating layer 18. Inevitably, tear 80 extends generally horizontally leading to seam delamination 81 which propagates along the interface between the adjoining surfaces of the relatively weakly adhesively bonded charge generating layer 18 and adhesive layer 20. Because of its appearance, localized seam delamination 81 is typically referred to as "seam puffing". The excessive thickness of splashing 68 and stress concentration at junction site 76 tend to promote the development of dynamic fatigue failure of seam 30 and can lead to separation of the joined edges 12 and 14 and severing of flexible imaging member 10. This greatly shortens the service life of flexible imaging member 10.

In addition to causing seam failure, tear 80 acts as a depository site which collects toner particles, paper fibers, dirt, debris and other undesirable materials during electrophotographic imaging and cleaning. For example, during the cleaning process, a conventional cleaning instrument (not shown), such as a cleaning blade, will repeatedly pass over tear 80. As the site of tear 80 becomes filled with debris, the cleaning instrument dislodges at least a portion of highly concentrated debris from tear 80. The amount of the dislodged debris, however, is often beyond the capability of the cleaning instrument to remove from imaging member 10. As a consequence, the cleaning instrument will dislodge the highly concentrated level of debris, but will not be able to remove the entire amount during the cleaning process. Therefore, portions of the highly concentrated debris will be deposited onto the surface of flexible imaging member 10. In effect, the cleaning instrument spreads the debris across the surface of flexible imaging member 10 rather than effectively removing the debris therefrom.

Besides leading to seam failure and debris spreading, when local seam delamination 81 occurs, the portion of flexible imaging member 10 above seam delamination 81, in effect, becomes a flap which can move upwardly. The upward movement of the flap presents an additional problem in the cleaning operation because it is an obstacle in the path of the cleaning instrument as the instrument travels across the surface of flexible imaging member 10. The cleaning instrument eventually strikes the flap when the flap extends upwardly. As the cleaning instrument strikes the flap, great force is exerted on the cleaning instrument and can lead to cleaning blade damage, e.g. excessive wear and tearing of a blade.

In addition to damaging the cleaning blade, collisions with the flap by the blade causes unwanted velocity variations in flexible member 10 during cycling. This unwanted velocity variation adversely affects the copy/print quality produced by the flexible imaging member 10, particularly in high speed precision machines such as in color copiers where colored toner images must be sequentially deposited in precisely registered locations. More specifically, copy/print quality is affected because imaging takes place on one part of flexible imaging member 10 simultaneously with the cleaning of another part of flexible imaging member 10.

The velocity variation problems encountered with flexible imaging member 10 are not exclusively limited to flexible imaging member 10 undergoing seam delamination 81. The discontinuity in cross-sectional thickness of the flexible imaging member 10 at junction sites 76 and 78 also can create unwanted velocity variations, particularly when flexible imaging member 10 bends over small diameter rollers of a belt module or between two closely adjacent rollers. Moreover, splashing 70 underneath the seam collides with acoustic image transfer assist subsystems (not shown) during dynamic belt cycling, thereby causing additional unacceptable imaging belt velocity disturbances.

Figure 4:
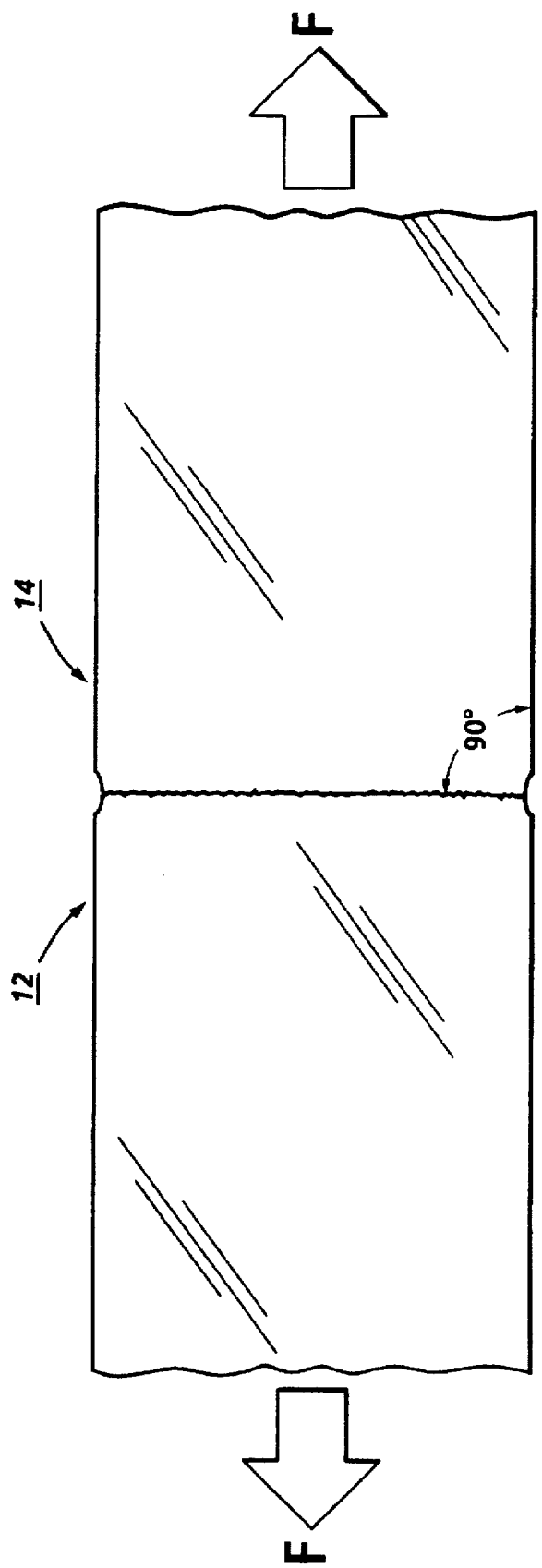
FIG. 4 is a top view of a flexible multiple layered ultrasonically welded seamed electrophotographic imaging belt of the prior art showing a seam that forms a 90° angle with one edge of the belt.

Illustrated in FIG. 4 is a top view representation of a typical prior art electrophotographic imaging member belt, having a lap-joint ultrasonically welded seam. As shown in the figure, the seam traverses the entire width of the imaging belt and is perpendicular to both edges of the belt to form a 90 degree angle, i.e. a skew angle of zero degree because the seam is congruent to an imaginary straight line perpendicular to the edges of the belt. When subjected to a tension force F, either by subjection to an applied imaging belt tension alone or due to the summation effect of the applied belt tension plus the induced tensile bending stress when the belt flexes over belt supporting rollers under machine operation conditions, the total force exerted circumferentially along the belt path is always directed against the entire transverse seam which is perpendicular to the acting force. This mechanical effect adversely affects the seam and promotes the development of a fatigue seam cracking/delamination problem. Moreover, this perpendicular seam configuration causes simultaneous collision of the entire seam overlap and splashings against the entire working surface of a cleaning blade or image acoustic transfer assist device, as well as with the belt support rollers during electrophotographic imaging and cleaning cycles. The effect of these mechanical interactions exacerbates cleaning blade wear and disturbs belt cycling speed uniformity.

Figure 5:
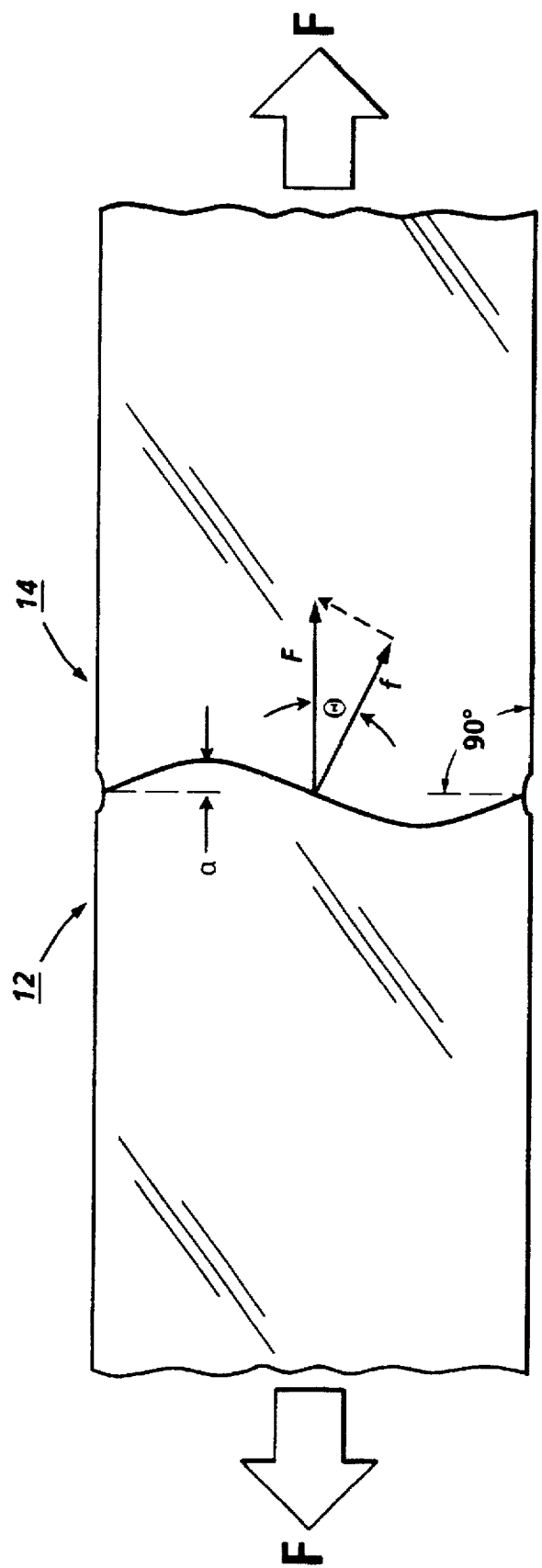
FIG. 5 is a top view of an illustrative embodiment of a flexible multiple layered ultasonically welded bent seam electrophotographic imaging belt of the present invention having a sine wave seam configuration.

In FIG. 5, the top view illustrates a lap-joint of an ultrasonically welded seamed electrophotographic imaging member belt of the present invention having a sine wave seam design. Although the seams illustrated in FIGS. 5 through 9 actually have a slightly rough appearance similar to that of the straight seam of FIG. 4 they are illustrated in the drawings as smooth lines in FIGS. 5 through 9 merely for the sake of convenience. The unique characteristic of the sine wave seam design is measured in degrees of angle by which the seam position departs from a straight seam configuration of the prior art and provides a continuum of tilt angles along the entire seam length. With the sine wave seam of this invention, the total tension force "F" that is applied to the belt will not be acting directly against the seam, but rather a reduced vector component "f". Therefore, the larger is the seam tilt angle Θ, the smaller the vector force f is acting on the seam and the greater the mechanical resistance will be to seam failure against the applied force F. Another added benefit is that the bent seam has more total seam length than that of the straight seam thereby mechanically reinforcing the seam and extending its service life. However, another important advantage of the bent seam configuration over conventional straight seams is that it provides only instantaneous localized point contacts against the cleaning blade, toner image acoustic transfer device, and belt support rollers during image cycling. This benign point contact of mechanical interaction eliminates the belt transporting speed disturbance problem and minimizes cleaning blade wear. The point contact interaction between a bent seam and the xerographic subsystems is in sharp contrast to the total collision effect observed with the straight seam belts of the prior art.

The extent of deviation of the sine wave seam from a straight line prior art seam is determined by the wave amplitude α of the sinusoidal wave. The wave amplitude 60 is measured from the crest of a wave to an imaginary straight connecting line (partially shown as dashed lines) linking the two ends of the seam. When the magnitude of a is decreased, as shown in FIG. 5, the bent seam approaches the characteristic of the straight seam and its distinctive physical and mechanical aspects are diminished. The bent seam literally becomes a straight prior art seam as the amplitude α of the wave is reduced to zero. Since electrophotographic imaging member belts employing a straight prior art seam usually have about a 13 millimeter (0.52 inch) wide band, strip or zone designated as a non-imaging area on each side of the seam in functional imaging systems, the sine wave seam embodiment of this invention, based on a 353 millimeter (13.9 inch) belt width, preferably has an amplitude α of less than about 13 millimeters (0.52 inch) to minimize waste of the useful imaging surface of the belt near the seam area. For imaging member belts having a belt width of about 353 millimeters (13.9 inches), an amplitude α between about 13 millimeters (0.52 inch) and about 2 millimeters (0.079 inch) is generally preferred. This corresponds to an amplitude to belt width ratio between about 3.7 percent and about 0.57 percent, respectively. Optimum results are achieved with an amplitude α between about 8 millimeters (0.315 inch) and about 4 millimeters (0.157 inch) which is equivalent to an amplitude to belt width ratio of between about 2.3 percent and about 1.1 percent. It is important to note that an amplitude α of less than about 2 millimeters (0.079 inch) or less than about 0.57 percent amplitude to belt width ratio, will significantly diminish the physical/mechanical benefits of the bent seam because its mechanical characteristics approach those of a straight seam perpendicular to the belt edges. An imaging member belt employing the bent seam embodiment of this invention should contain between about one half wavelength and about 5 wavelengths across the width of the belt in order to provide satisfactory performance. A range of from between about one half and about 3 wavelengths is preferred. Optimum results are achieved with wavelengths between about 1 and about 1.5 wavelengths. For seams containing more than about 5 wavelengths, too many point contacts are encountered against subsystems thereby minimizing the benefits of this invention. If the seam has less than about one half wavelength, it essentially behaves like a skewed straight seam. If desired, the bent seam of this invention may have a wave, ripple or sawtooth pattern or the like that is irregular with variations in amplitude for different waves, ripples or sawtooths along the length the seam or can even comprise a mixture of smooth rounded curves and angular bends or curves.

Figure 6:
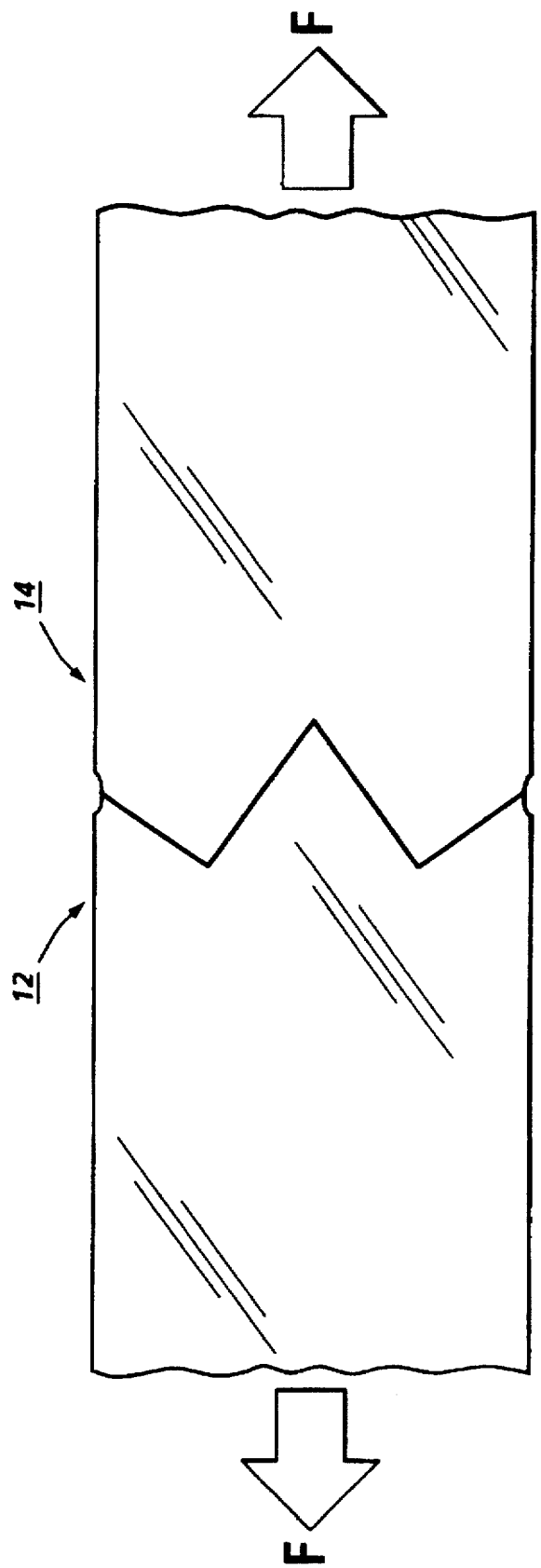
FIG. 6 is a top view of an illustrative embodiment of a flexible multiple layered ultrasonically welded bent seam electrophotographic imaging belt of the present invention having a sawtooth wave seam configuration.

An alternative sawtooth shaped bent seam design embodiment is shown in FIG. 6. Although the shape of the sawtooth wave form is different from that of the sinusoidal seam, the sawtooth wave seam will provide the same physical and mechanical benefits as a sine wave seam.

Figure 7:
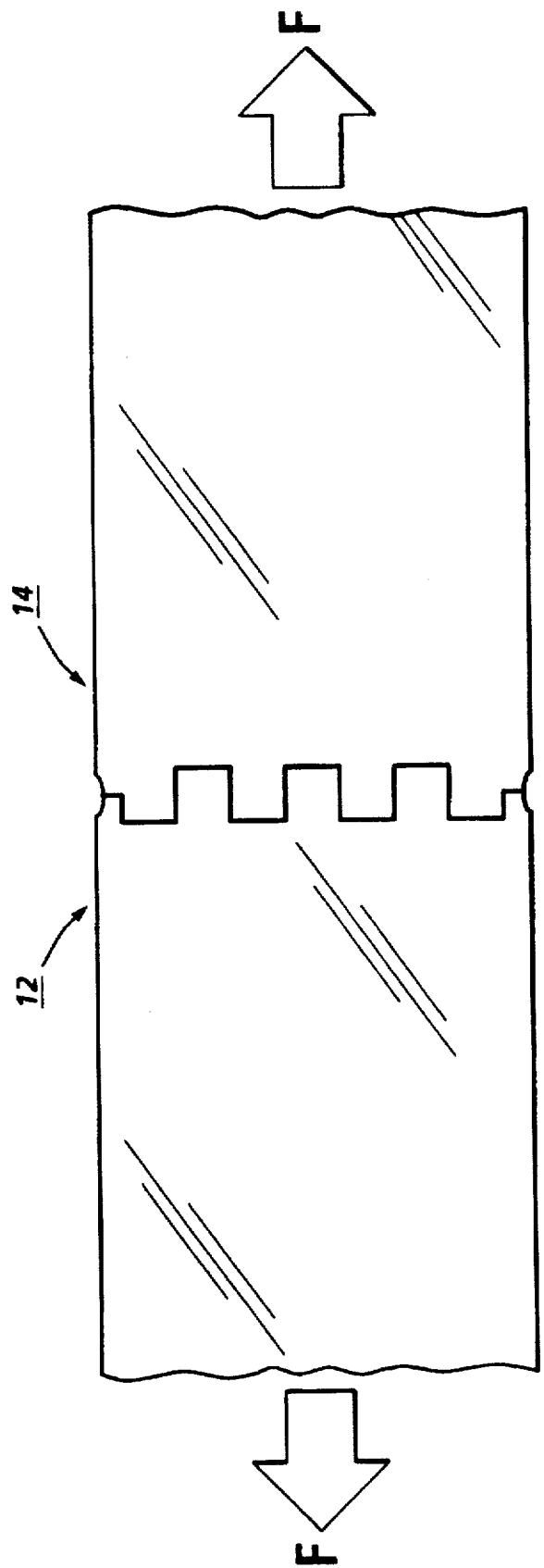
FIG. 7 is a top view of an illustrative embodiment of a flexible multiple layered ultrasonically welded bent seam electrophotographic imaging belt of the present invention having a square wave seam pattern.
Figure 8:
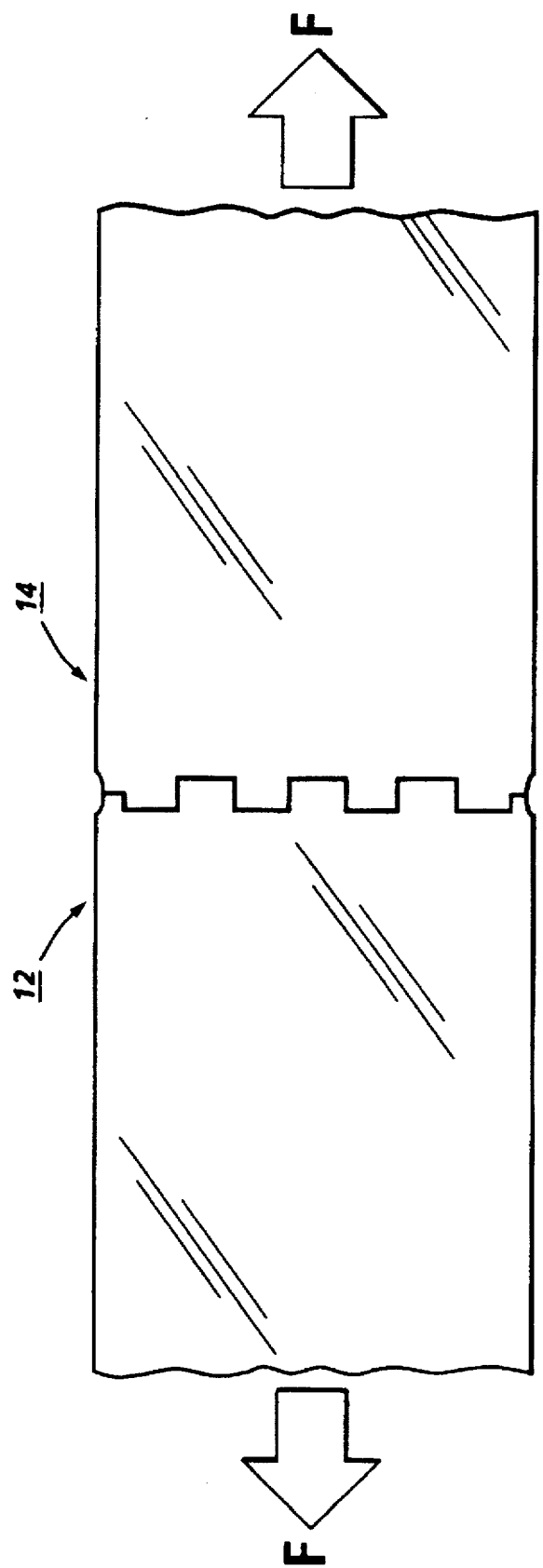
FIG. 8 is a top view of an illustrative embodiment of a flexible multiple layered ultrasonically welded bent seam electrophotographic imaging belt of the present invention having a rectangular wave seam configuration.

FIG. 7 illustrates still another bent seam design embodiment. The square wave seam shown in this figure will provide excellent seam rupture resistance strength. This is due to the increase in total seam length which resists externally applied tensile. However, this embodiment may not provide the desired reduction of mechanical interactions against subsystems of an imaging machine because it has more contacting points than the bent seam designs presented in FIGS. 5 and 6. The illustration in FIG. 8 is yet another alternative seam design embodiment of present invention. It is a rectangular wave seam that is modified from the square wave seam of FIG. 7 and may provide mechanical performance equivalent to the square wave seam.

Figure 9:
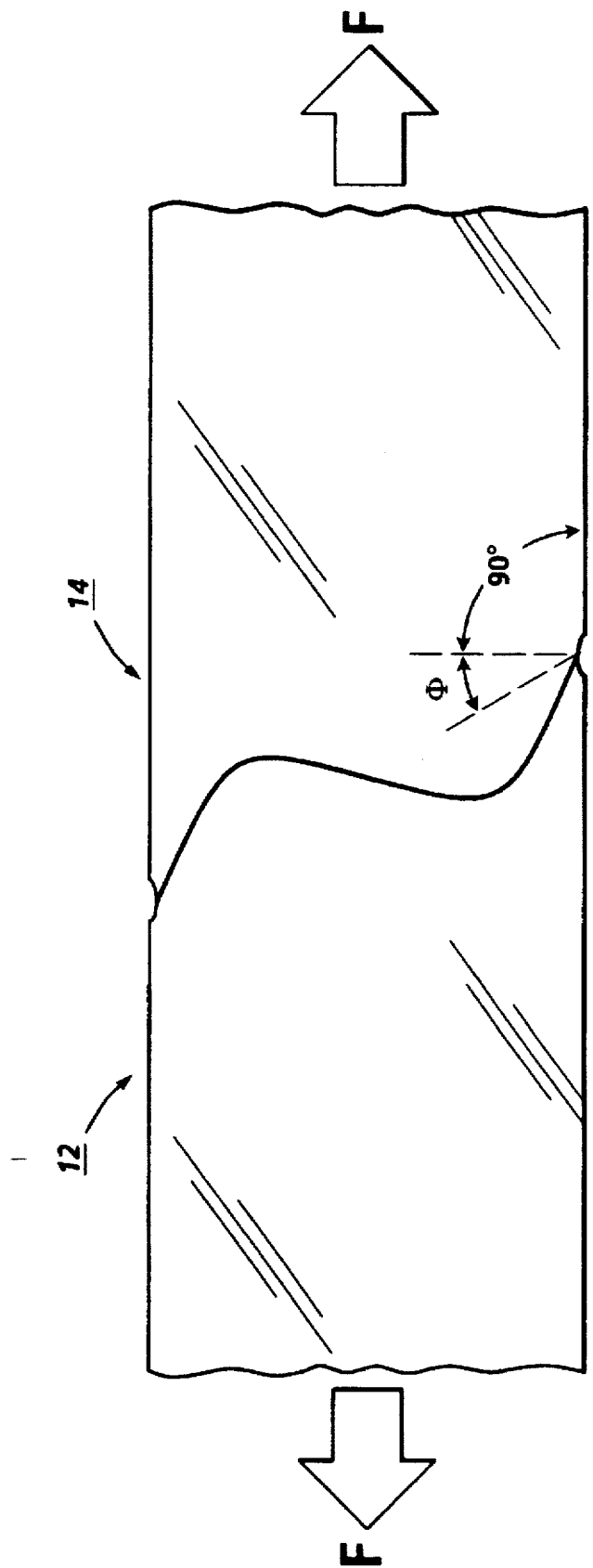
FIG. 9 is a top view of an illustrative embodiment of a flexible multiple layered ultrasonically welded bent seam electrophotographic imaging belt of the present invention having a sine wave seam shape and with an imaginary straight connecting line skew angle Φ.

Shown in FIG. 9 is a sine wave seam design similar to the representation in FIG. 5, except that an imaginary straight connecting line (partially shown as a dashed line) passing through the sine wave seam of FIG. 9 is tilted away from an imaginary straight line perpendicular to one end of the sine wave seam of FIG. 5. The degree of tilt from the imaginary straight perpendicular line originating from one end of the sine wave seam of FIG. 5 is represented by a skew angle Φ. Tilting of the imaginary connecting line of the bent seam provides the added benefits of enhancing the mechanical performance of the seam including rupture resistance strength and reduction of mechanical interactions against subsystems of an imaging machine. Thus, reduction of mechanical interactions against subsystems of an imaging machine can also be further enhanced for the bent seam designs shown in FIGS. 6, 7 and 8 by tilting the imaginary straight connecting line relative to an imaginary straight line which is perpendicular to the edges of the belt and which originates from one end of the imaginary straight connecting line.

For noticeably improved results in reducing belt velocity variations with the rectangular and square wave embodiments and for greater rupture resistance strength for all bent seam embodiments, the skew angle of the imaginary straight connecting line should be between about 0.5 degree and about 60 degrees. Below about 0.5 degree, the additional gain in belt velocity variation suppression due to the skewing effect becomes insignificant. A skew angle of between about 1 degree and about 20 degrees is preferred for the imaginary straight connecting line relative to an imaginary straight line which is perpendicular to the edges of the belt and which originates from one end of the imaginary straight connecting line. However, from the standpoint of minimizing loss of non-imageable area due to skewing, the optimum skew angle is between about 2 degrees and about 10 degrees.

In accordance with the embodiments of the present invention, seam fabrication by ultrasonic lap-joining to form flexible imaging member belts from sheets having two parallel sides and a matching pair of bent cut ends produces skewed seam configurations possessing enhanced overall mechanical properties and seam performance. The improved belts of this invention extend the service life of the belts and enhance subsystem performance. Very importantly, the flexible imaging member belts of the present invention have successfully suppressed seam mechanical interaction with cleaning blades, belt support rollers and image acoustic transfer assist subsystems; eliminated velocity variation of the cycling imaging belts; and improved dynamic fatigue cracking/delamination resistance of the seam when passed over small diameter rollers.

This invention will further be illustrated in the following, non-limiting examples, it being understood that these examples are intended to be illustrative only and that the invention is not intended to be limited to the materials, conditions, process parameters and the like recited therein.

EXAMPLE I

A photoconductive imaging member web was prepared by providing a titanium coated polyester substrate having a thickness of 76.2 micrometers (3 mils) and applying thereto a siloxane blocking layer having a dry thickness of 0.05 micrometer. An adhesive interface layer was then prepared by applying to the blocking layer a polyester adhesive having a dry thickness of 0.07 micrometer. The adhesive interface layer was thereafter coated with a charge generating layer containing 7.5 percent by volume trigonal selenium, 25 percent by volume N,N'-diphenyl-N,N'-bis(3-methylphenyl)-1,1'-biphenyl-4,4'-diamine, and 67.5 percent by volume polyvinylcarbazole. This charge generating layer had a dry thickness of 2.0 micrometers. This coated imaging member web was overcoated with a charge transport layer extrusion of the coating material. The charge transport layer contained N,N'-diphenyl-N,N'-bis(3-methylphenyl)-1,1'-biphenyl-4, 4'-diamine and Makrolon R, a polycarbonate resin at a weight ratio of 1:1 and had a thickness of 24 micrometers. An anti-curl back coating containing 88.2 gms of polycarbonate resin, 0.9 gm of polyester resin and 4.5 gms of silane treated microcrystalline silica was applied to the rear surface (side opposite the photogenerator layer and charge transport layer) of the photoconductive imaging member web and the final dried photoconductive imaging member web had a total thickness of about 116 micrometers.

EXAMPLE II

The photoconductive imaging member web of Example I was cut to provide five 20.32 cm (8 in.)×20.32 cm (8 in.) square sheets of imaging samples. The first imaging sample was then cut through the middle to give two rectangular specimens having vertical cut ends which when overlapped and joined would yield a seam having a 0° skew angle to represent a prior art control seam. The remaining imaging samples were cut through each center points, in a manner, to provide sets of test specimens with varying degrees of slant cut ends such that when joined correspondingly they would produce seam skew angles of 5, 15, 30 and 60 degrees, measured relative to an imaginary straight line perpendicular to the edges of the sample sheets and originating from one end of the slant cut, for ultrasonically welded seams to demonstrate the mechanical improvement that can be realized even with a straight seam by just skewing the seam.

For each set of test specimens, the cut end of each test specimen was overlapped to a distance of about one millimeter over the opposite cut end in a manner similar to that illustrated in FIG. 1 and joined by conventional ultrasonic welding techniques using 40 KHz sonic energy supplied to a welding horn to form a seam similar to that illustrated in FIG. 2. The welding horn tip had a flat bottom that was 1 millimeter wide and 13 millimeters long, the longer dimension being perpendicular to the length of the seam. The fabricated seam samples having the various seam skew angles were then evaluated for their respective physical and mechanical properties.

For seam rupture elongation, rupture strength and cracking/delamination strain determinations, the following testing procedures were followed using an Instron Tensile Tester (Model TM, available from Instron Corporation):

(a) A strip of test sample was cut for each of the seam configurations of the above Examples. Each test sample had the dimensions of 1.27 cm×10.16 cm (0.5 in.×4 in.) with the seam situated at the middle of the test sample.

(b) The test sample was inserted into the Instron jaws using a 5.08 cm (2 inch) gage length and seam positioned at the middle between the jaws.

(c) The seam sample was pulled at a cross-head speed of 5.08 cm/minute (2 in./minute), a chart speed at 5.08 cm/minute (2 in./minute), and a calibration of 22 kilograms (50 pounds) full scale to observe for tensile seam rupture as well as seam cracking/delamination.

(d) The load, in kilograms, required to rupture the seam was divided by 1.27 cm (0.5 in.) to obtain the seam rupture strength in Kgs/cm.

(e) The elongation at which seam cracking/delamination occurred was divided by the gaged length of the sample to obtain cracking/delamination strain.

The mechanical measurement results summarized in Table I below showed that the seam cracking/delamination resistance, rupture elongation, and rupture strength were all substantially enhanced by the implementation of the skewed seam configuration. By increasing the seam skew angle, the mechanical properties of the seams were increased and the extent of the observed mechanical improvement was dependent on the degree of seam skewing. At a skew angle range between 30 degrees and 60 degrees, test sample tensile rupture did not occur at the seam but somewhere else in the sample, indicating that the skewed seam possessed more mechanical strength than the material of the test sample in resisting the externally applied stress to the point of test sample material failure. According to the normalized energy absorption results listed in the last column of the table, the toughness of seams of this invention was also significantly improved by about 350 percent in resistance to rupture than the prior art seam control counterpart when a 30 degrees skew angle for the seam was reached.

TABLE I

| Seam Skewed Angle | Delamination Strain (%) | Break Elongation (%) | Break Strength (Kgs/cm) | Energy Absorbed (%) |
|---|---|---|---|---|
| 0° | 1.8 | 10.0 | 9.8 | 100 |
| 5° | 3.5 | 17.3 | 10.8 | 186 |
| 15° | 5.7 | 23.2 | 11.7 | 260 |
| 30° | 8.7 | 36.7 | 13.4 | 448 |
| 60° | 14.1 | 102.2* | 14.3* | 1,176* |

*No seam rupture occurred, but sample material itself ruptured.

EXAMPLE III

For seam dynamic fatigue endurance testing, a 10.16 cm.×20.22 cm (4 in.×8 in.) test sample having the seam situated at the middle of the test sample was cut from samples described in Example II having seam skew angles of zero and 15 degrees. With a four pound weight attached at one end to provide a one lb/in. width tension, the test sample with the seam was 180° wrapped over a 3.0 mm (0.12 inch) diameter free rotating roller and the opposite end of the test sample was gripped by hand. Under these conditions, the seam of the test sample was dynamically flexed back and forth over the roller by manually moving the hand up and down, at a rate of one flex per second, until seam cracking/delamination occurred. The results obtained from this test show that the zero degree skew angle of the prior art control seam developed total seam cracking/delamination after only 8 cycles of flexing. In contrast, seam failure was extended to about 45 cycles of flexing test when the skew angle of the seam was increased to 15°. This result was a 463 percent increase in seam life improvement and demonstrated the effectiveness of seam skewing for mechanically robust seam function enhancement as well.

EXAMPLE IV

The photoconductive imaging web of Example I was cut to provide a 10.16 cm (4 inch)×20.32 cm (8 inch) imaging member sheet. This rectangular imaging member sheet was split through the mid section of the long dimension to yield one full sine wave length across the width of the imaging member sheet, having a straight imaginary connecting line perpendicular to the edges of the sheet, and a wave amplitude α of 6 mm (0.24 inch) for the matching pair of cut ends. This matching pair of cut ends were then overlapped to a distance of about one millimeter and ultrasonically welded into a sine wave seam according to the procedures described in Example II. When dynamic flexing over a 3.0 mm (0.12 inch) diameter roller in the same manner as described in Example III, the onset of seam cracking/delamination was perceived only after 15 flexes of testing. Since the sine wave seam was an amalgam of many different skew angles, it functioned and behaved like the skewed seams of Example II to effectively extend the mechanical service life of the seam. In comparison to the perpendicular straight prior art control seam of Example II, the sine wave seam of the present invention possessed a dynamic fatigue life enhancement equivalent to about 9.4 times that for the control seam of Example I.

EXAMPLE V

The photoconductive imaging web of Example I was cut to provide: one rectangular imaging member sheet with vertical cut ends at a zero degree slant or skew angle to represent prior art seams; and one imaging member sheet in the general shape of a rectangle but having a matching pair of sine wave shaped edges at opposite ends of the sheet to provide a welded seam design of this invention. The overall dimensions of these imaging sheets were 41.4 cm (16.3 inc.)×114.5 cm (45.1 in.). The opposite ends of all these imaging member sheets were overlapped and ultrasonically joined into imaging member belts to form the desired welded seams, using the seaming technique described in Example II, for the 0° straight seam of the prior art and the corresponding sine wave seam profile similar to that illustrated in FIG. 5. The belt bearing the sine wave seam of this invention had a wave amplitude α of 6 mm (0.24 inch) and a full wavelength (i.e. a full sine wave cycle with positive and negative amplitudes) extending across the width of the belt. These imaging member belts were subsequently evaluated for velocity variations when cycled while in contact with the cleaning blade, the image acoustic transfer assist device, and the belt support rollers of a Xerox 5775 xerographic copier machine operating at a belt cycling velocity of 19.1 cm (7.5 inches) per second.

The cyclic test data obtained showed that the control imaging belt having the zero degree skew straight seam of the prior art developed a 4.2 percent average belt velocity disturbance due to mechanical interactions with the cleaning blade, image acoustic transfer assist device and belt support roller subsystems. In sharp contrast, the imaging belt with the sine wave seam fabricated in accordance with this invention exhibited only a small average velocity variation of 1.4 percent. Compared to a background average belt velocity variance of 1.3 percent, it became apparent that the velocity variations problem in a conventional imaging belt could effectively be suppressed by utilizing a belt with an improved seam configuration of the present invention.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A flexible electrostatographic imaging belt formed from a sheet having two parallel sides and two opposite ends, said belt comprising a flexible support layer, at least one coating comprising an electrostatographic imaging layer comprising a film forming polymer and a seam comprising ultrasonically welded overlapped opposite ends of said sheet, said seam having a bent shape extending from one edge of said belt to the opposite edge of said belt.

2. A flexible electrostatographic imaging belt according to claim 1 wherein said electrostatographic imaging layer comprises a charge generating layer and a charge transport layer.

3. A flexible electrostatographic imaging belt according to claim 1 wherein said bent shape seam has an imaginary straight connecting line linking the ends of said seam and said connecting line is perpendicular to both edges of said belt.

4. A flexible electrostatographic imaging belt according to claim 3 wherein said bent shape seam crosses said connecting line at least once.

5. A flexible electrostatographic imaging belt according to claim 1 wherein said bent shape seam has an imaginary straight connecting line linking the ends of said seam and said imaginary straight connecting line is skewed relative to an imaginary straight line perpendicular to said edges of said belt and originating from one end of said imaginary straight connecting line.

6. A flexible electrostatographic imaging belt according to claim 5 wherein said imaginary straight connecting line is skewed between about 1 degree and about 20 degrees relative to said imaginary straight line perpendicular to said edges of said belt and originating from one end of said imaginary straight connecting line.

7. A flexible electrostatographic imaging belt according to claim 1 wherein said bent shape has a square wave shape.

8. A flexible electrostatographic imaging belt according to claim 1 wherein said bent shape has a sawtooth wave shape.

9. A flexible electrostatographic imaging belt according to claim 1 wherein said seam is thicker than the remainder of said sheet.

10. A flexible electrostatographic imaging belt comprising a flexible support layer, at least one coating comprising an electrostatographic imaging layer comprising a film forming polymer, an ultrasonically welded seam comprising overlapped opposite ends of a sheet having two parallel sides and two opposite ends, said seam having a bent shape extending from one edge of said belt to the opposite edge of said belt, said bent shape having a sine wave shape having an amplitude between 2 millimeters and about 13 millimeters.

11. A flexible electrostatographic imaging belt according to claim 10 wherein said sine wave has an amplitude to belt width ratio between about 3.7 percent and about 0.57 percent.

12. A flexible electrostatographic imaging belt according to claim 10 wherein said sine wave has a wavelength of between about one half wavelength and about 5 wavelengths.

13. A process for fabricating a flexible electrostatographic imaging belt comprising providing a sheet comprising a flexible support layer and at least one coating comprising an electrostatographic imaging layer comprising a film forming polymer, said sheet having two parallel sides and two opposite ends having matching bent profiles, said sheet having a first major exterior surface opposite and parallel to a second major exterior surface, overlapping an edge of said first major exterior surface adjacent one of said ends onto an edge of said second major exterior surface adjacent the other one of said ends to form a overlapped joint in which said bent profiles of said opposite ends match, and permanently securing said ends to each other by ultrasonic welding to form a seam having a bent shape.

14. A process according to claim 12 wherein said bent seam has an imaginary straight connecting line linking opposite ends of said seam and said connecting line is perpendicular to said two parallel sides of said belt.

15. A process according to claim 12 wherein said seam has an imaginary straight connecting line linking opposite ends of said seam and the profile of said bent seam crosses said connecting line at least once.

16. A process according to claim 12 wherein said bent seam has an imaginary straight connecting line linking opposite ends of said seam and said imaginary straight connecting line is skewed relative to an imaginary straight line perpendicular to said two parallel sides of said belt and originating from one end of said imaginary straight connecting line.

17. A process according to claim 16 wherein said imaginary straight connecting line is skewed between about 1 degree and about 20 degrees relative to an imaginary straight line perpendicular to said two parallel sides of said belt and originating from one end of said imaginary straight connecting line.

18. An imaging process comprising providing a flexible electrostatographic imaging belt formed from a sheet having two parallel sides and two opposite ends, said belt comprising a flexible support layer, at least one electrostatographic imaging layer comprising a film forming polymer, and a seam comprising ultrasonically welded overlapped opposite ends of said sheet, said seam having a bent shape extending from one edge of said belt to the opposite edge of said belt, forming an electrostatic latent image on said belt, developing said latent image to form a toner image and transferring said toner image to a receiving member.

19. An imaging process according to claim 18 including cleaning said belt with a cleaning blade and repeating said forming, developing and transferring steps at least once.

20. An imaging process according to claim 18 wherein said bent seam has an imaginary straight connecting line linking opposite ends of said seam and said imaginary straight connecting line is skewed relative to an imaginary straight line perpendicular to said edges of said belt and originating from one end of said imaginary straight connecting line.

* * * * *